United States Patent [19]

Haas et al.

[11] Patent Number: 5,104,906

[45] Date of Patent: Apr. 14, 1992

[54] PROCESS FOR THE PREPARATION OF POLYURETHANE FOAMS

[75] Inventors: Peter Haas, Haan; Hans Hettel, Roesrath-Forsbach, both of Fed. Rep. of Germany; Gundolf Jacobs, Pittsburgh, Pa.

[73] Assignee: Bayer Aktiengesellschaft, Leverkusen Bayerwerk, Fed. Rep. of Germany

[21] Appl. No.: 718,745

[22] Filed: Jun. 21, 1991

Related U.S. Application Data

[63] Continuation-in-part of Ser. No. 416,216, Oct. 2, 1989, abandoned.

[30] Foreign Application Priority Data

Dec. 16, 1988 [DE] Fed. Rep. of Germany ....... 3842384

[51] Int. Cl.$^5$ ............................................. C08G 18/14
[52] U.S. Cl. .................................... 521/108; 521/128; 521/163; 524/710
[58] Field of Search ............... 521/108, 128, 163, 107, 521/165; 528/72, 73

[56] References Cited

U.S. PATENT DOCUMENTS

| | | | |
|---|---|---|---|
| 3,664,975 | 5/1972 | Kerst | 521/168 |
| 4,010,124 | 3/1977 | Hofmann et al. | 521/168 |
| 4,221,875 | 9/1980 | Yukuta et al. | 521/128 |
| 4,258,141 | 3/1981 | Jarre et al. | 521/114 |
| 4,268,633 | 5/1981 | Fearing | 521/168 |
| 4,312,959 | 1/1982 | Treadwell et al. | 521/107 |
| 4,529,742 | 7/1985 | von Bonin et al. | 521/107 |
| 4,747,093 | 7/1988 | Ricciardi et al. | 521/107 |
| 4,849,459 | 7/1989 | Grace et al. | 521/110 |
| 4,859,713 | 8/1989 | Blount et al. | 521/106 |
| 4,892,893 | 1/1990 | Grace et al. | 521/128 |

FOREIGN PATENT DOCUMENTS

| | | |
|---|---|---|
| 367714 | 5/1990 | European Pat. Off. |
| 2325648 | 12/1974 | Fed. Rep. of Germany |
| 2094315 | 9/1982 | United Kingdom |
| 2163762 | 3/1986 | United Kingdom |

8809351 12/1988 World Int. Prop. O.

*Primary Examiner*—John Kight, III
*Assistant Examiner*—Shelley A. Wright
*Attorney, Agent, or Firm*—Joseph C. Gil

[57] ABSTRACT

The present invention relates to a process for the preparation of polyurethane foams in which polyisocyanates are reacted with compounds having a molecular weight of from 400 to 10,000 and containing at least two isocyanate-reactive hydrogen atoms, in the presence of water and/or organic blowing agents, catalysts, melamine as a flameproofing agent, and other flameproofing agents selected from phosphonic acid esters having the general formula

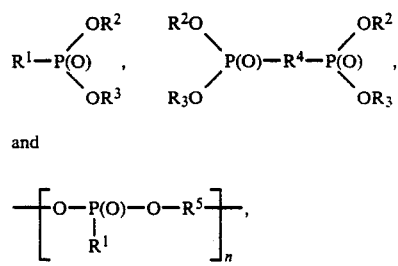

and $$\left[ \text{O}-\overset{\text{R}^1}{\underset{}{\text{P}(\text{O})}}-\text{O}-\text{R}^5 \right]_n,$$

wherein $R^1$ is $C_1$–$C_6$ alkyl, $C_2$–$C_6$ unsaturated alkyl, $C_5$–$C_{12}$ cycloalkyl, $C_7$–$C_{15}$ aralkyl, or $C_6$–$C_{12}$ aryl, $R^2$ and $R^3$ are independently $C_1$–$C_6$ alkyl, $C_2$–$C_6$ unsaturated alkyl, $C_5$–$C_{12}$ cycloalkyl, $C_7$–$C_{15}$ aralkyl, or $C_6$–$C_{12}$ aryl, or $R^2$ and $R^3$ together are $C_2$–$C_4$ alkylene, $R^4$ is $C_1$–$C_6$ alkylene, $C_5$–$C_{12}$ cycloalkylene, $C_7$–$C_{15}$ aralkylene, or $C_6$–$C_{12}$ arylene, $R^5$ is $C_2$–$C_6$ alkylene, $C_5$–$C_{12}$ cycloalkylene, $C_7$–$C_{15}$ aralkylene, or $C_6$–$C_{12}$ arylene, and n is an integer of from 1 to about 100.

The process is optionally carried out in the presence of compounds containing at least two isocyanate-reactive hydrogen atoms and having a molecular weight of from 32 to 399, and known surface-active additives and auxiliaries.

11 Claims, No Drawings

PROCESS FOR THE PREPARATION OF POLYURETHANE FOAMS

CROSS REFERENCE TO RELATED APPLICATION

This application is a continuation-in-part of application Ser. No. 07/416,216, filed on Oct. 2, 1989, now abandoned.

BACKGROUND OF THE INVENTION

Polyurethane foams having improved flame-retardant properties have long been sought and, because flammability requirements are becoming increasingly more stringent, continue to receive attention. As a result, particular attention has recently been paid to the British Furniture and Furnishings Fire Safety Regulations of Consumer Protection 1988/no. 1324, which imposes particularly stringent demands on flammability resistance of the foams. In this test, a wooden crib weighing 17 g is filled with a certain amount of isopropyl alcohol and ignited on a chair frame finished with the foam. The flames must die within 10 minutes and the weight loss should be no more than 60 g. This test imposes particularly strict requirements on the foams in respect of the ignition resistance thereof. In addition to the more stringent flame resistance requirements, restricted use of phosphate esters or haloalkyl phosphate esters as flameproofing agents is being urged.

Another approach to flameproofing polyurethane foams uses melamine as a flameproofing agent. In this regard, see German Offenlegungsschrift 2,809,084, British Patent 2,177,406, German Offenlegungsschrift 3,530,519, German Offenlegungsschrift 2,815,554, and British Patent 2,094,315. However, it has now been found that melamine still does not impart adequate flameproofing to polyurethane foam under long-term use, even when trischloroethyl phosphate or other phosphates, for example, are used as additional flameproofing agents. This disadvantage is overcome by the process of the present invention.

SUMMARY OF THE INVENTION

The present invention relates to a process for the preparation of polyurethane foams comprising reacting
(1) polyisocyanates with
(2) compounds having a molecular weight of from 400 to 10,000 and containing at least two isocyanate-reactive hydrogen atoms,
in the presence of
(3) water and/or organic blowing agents,
(4) catalysts,
(5) melamine as a flameproofing agent, and
optionally in the presence of
(6) phosphonic acid ester flameproofing agents selected from the group consisting of compounds having the general formulas

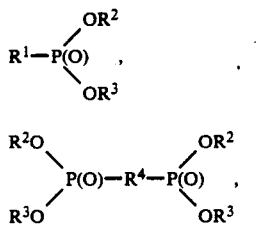

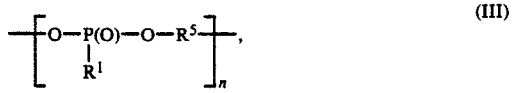

$R^1$ is $C_1$–$C_6$ alkyl, $C_2$–$C_6$ unsaturated alkyl, $C_5$–$C_{12}$ cycloalkyl, $C_7$–$C_{15}$ aralkyl, or $C_6$–$C_{12}$ aryl, $R^2$ and $R^3$ are independently $C_1$–$C_6$ alkyl, $C_2$–$C_6$ unsaturated alkyl, $C_5$–$C_{12}$ cycloalkyl, $C_7$–$C_{15}$ aralkyl, or $C_6$–$C_{12}$ aryl, or $R^2$ and $R^3$ together are $C_2$–$C_4$ alkylene, $R^4$ is $C_1$–$C_6$ alkylene, $C_5$–$C_{12}$ cycloalkylene, $C_7$–$C_{15}$ aralkylene, or $C_6$–$C_{12}$ arylene, $R^5$ is $C_2$–$C_6$ alkylene, $C_5$–$C_{12}$ cycloalkylene, $C_7$–$C_{15}$ aralkylene, or $C_6$–$C_{12}$ arylene, and n is an integer of from 1 to about 100, and (7) compounds containing at least two isocyanate-reactive hydrogen atoms and having a molecular weight of from 32 to 399, and (8) known surface-active additives and auxiliaries.

Preferred compounds (2) include polymer-modified polyols and/or polyols having predominantly primary hydroxyl groups.

The term "$C_1$–$C_6$ alkyl" refers to straight or branched chain aliphatic hydrocarbon groups having from 1 to 6 carbon atoms. Examples of $C_1$–$C_6$ alkyl are methyl, propyl, butyl, pentyl, hexyl, and the isomeric forms thereof.

The term "$C_2$–$C_6$ unsaturated alkyl" refers to straight or branched chain aliphatic hydrocarbon groups having from 2 to 6 carbon atoms and containing one or more carbon-carbon double or triple bonds. Examples of $C_2$–$C_6$ unsaturated alkyl are vinyl, allyl, butenyl, pentenyl, and hexenyl and the isomeric forms thereof.

The term "$C_5$–$C_{12}$ cycloalkyl" refers to cyclized aliphatic hydrocarbon groups having from 5 to 12 carbon atoms. Examples of $C_5$–$C_{12}$ cycloalkyl are cyclopentyl and cyclohexyl.

The term "$C_7$–$C_{15}$ aralkyl" refers to aromatically substituted alkyl groups having from 7 to 15 carbon atoms where the aromatic substituent is preferably an aromatic hydrocarbon group. Examples of $C_7$–$C_{15}$ aralkyl are benzyl and β-naphthylmethyl.

The term "$C_6$–$C_{12}$ aryl" refers to aromatic hydrocarbon groups having from 6 to 12 aromatic ring carbon atoms. Examples of $C_6$–$C_{12}$ aryl include phenyl and naphthyl, preferably phenyl.

The term "alkylene" refers to straight or branched chain aliphatic hydrocarbon groups bonded through two different carbon atoms so as to form a chain (for example, $R^4$ or $R^5$) or a cyclic structure (for example, $R^2$ and $R^3$ taken together). Examples of alkylene are methylene, ethylene, 1,3-propylene, and 1,4-butylene.

The terms "cycloalkylene," "aralkylene," and "arylene," in a manner analogous to the term "alkylene," refer respectively to cycloalkane, aryl-substituted alkanes, or aromatic hydrocarbons bonded through two different carbon atoms.

Each of groups $R^1$, $R^2$, and $R^3$ can optionally be substituted with one or more halogen (such as fluorine, chlorine, or bromine), alkyl, alkoxy, alkanoyl, alkoxycarbonyl, alkanamido, nitro, sulfonyl, and other substituents known in the art.

DETAILED DESCRIPTION OF THE INVENTION

Preferred embodiments of the process according to the invention are characterized by the use of
1) polyurea dispersions in polyethers as the polymer-modified polyols,
2) alkanolamine adducts of diisocyanates in polyols as the polymer-modified polyols.
3) grafted polyethers obtained by polymerization of acrylonitrile and/or styrene in polyethers as the polymer-modified polyols,
4) dimethyl methylphosphonate, dimethyl ethylphosphonate, dimethyl phenylphosphonate, ethylene bis(dimethylphosphonate), bis(2-chloroethyl) methylphosphonate, polyethylene methylphosphonate, tetrakis(2-chloroethyl) ethylenebisphosphonate, bis(2-chloroethyl) phenylphosphonate, dimethyl vinylphosphonate, dimethyl allylphosphonate, or bis(2-chloroethyl) 2-chloroethylphosphonate as the flameproofing agent (6), and
5) melamine having a particle size of from 5 to 90 micrometers (preferably from 5 to 50 micrometers).

The following starting components are used for the preparation of the polyurethane foams;

1. Aliphatic, cycloaliphatic, araliphatic, aromatic, and heterocyclic polyisocyanates of the type described, for example, W. Siefken in *Justus Liebigs Annalen der Chemie*, 562, pages 75 to 136. Suitable such polyisocyanates include those corresponding to the formula

Q(NCO)$_n$ in which
n is an number from 2 to 4 (preferably 2), and
Q is an aliphatic hydrocarbon group containing 2 to about 18 (preferably 6 to 10) carbon atoms, a cycloaliphatic hydrocarbon group containing 4 to about 15 (preferably 5 to 10) carbon atoms, an aromatic hydrocarbon group containing 6 to about 15 (preferably 6 to 13) carbon atoms, or an araliphatic hydrocarbon group containing about 8 to about 15 (preferably 8 to 13) carbon atoms.

Examples of such suitable polyisocyanates include the polyisocyanates described on pages 10–11 of German Offenlegungsschrift 2,832,253.

In general, it is preferred to use the commercially available polyisocyanates, such as 2,4- and 2,6-tolylene diisocyanate and mixtures of these isomers ("TDI"); polyphenyl polymethylene polyisocyanates of the type obtained by phosgenation of aniline-formaldehyde condensates ("crude MDI"); and polyisocyanates containing carbodiimide groups, urethane groups, allophanate groups, isocyanurate groups, urea groups, or biuret groups ("modified polyisocyanates"), particularly those modified polyisocyanates derived from 2,4- and/or 2,6-tolylene diisocyanate and from 4,4'- and/or 2,4'-diphenylmethane diisocyanate.

2. Active-hydrogen starting components include (a) known "polymer-modified" polyols and (b) polyols that contain predominantly primary OH groups.

Preferred polymer-modified polyols (a) include dispersions of (i) polymer-containing, relatively high molecular weight hydroxyl compounds obtained by reaction of mono- and/or polyisocyanates with polyamines containing primary and/or secondary amino groups, hydrazines, hydrazides, or alkanolamines in (ii) a compound containing from 1 to 8 primary and/or secondary hydroxyl groups and having a molecular weight of 400 to 10,000.

Such dispersions of polymer-containing, relatively high molecular weight hydroxyl compounds are described, for example, in German Auslegeschrift 2,519,004; German Offenlegungsschriften 2,550,796, 2,550,797, 2,550,860, 2,550,833, 2,550,862, 2,638,759, and 2,639,254; U.S. Pat. Nos. 4,374,209 and 4,381,351; and European Application 79,115.

It is also possible to use dispersions of reaction products of polyisocyanates (particularly diisocyanates) and alkanolamines in polyethers (for example, German Offenlegungsschrift 3,103,757) and dispersions of homopolymers or copolymers of unsaturated monomers, such as styrene or acrylonitrile, in polyethers (so-called "polymer polyols").

Preferred polyols (b) include "active" relatively high molecular weight hydroxyl compounds that contain predominantly primary OH groups and which contain no dispersed components of relatively high molecular weight. Such polyols, which are known compounds, may in principle be used as the only active-hydrogen starting components.

3. Water (preferred) and/or readily volatile organic substances are used as blowing agents.

4. The catalysts used in accordance with the invention are those known as such from polyurethane chemistry, such as tertiary amines and organometallic compounds.

5. Melamine having a particle size of from 5 to 90 (preferably 5 to 50) micrometers is used as a flameproofing agent. The preferred amount of melamine is from about 15 to about 100 parts by wt. (more preferably from 15 to 50 parts by wt.) per 100 parts by wt. of isocyanate-reactive component (2).

6. Other flameproofing agents used according to the present invention include phosphonic acid esters corresponding to general formula (I), preferably dimethyl methylphosphonate, dimethyl ethylphosphonate, dimethyl phenylphosphonate, ethylene bis(dimethylphosphonate), bis(2-chloroethyl) methylphosphonate, polyethylene methylphosphonate, tetrakis(2-chloroethyl) ethylene bisphosphonate, bis(2-chloroethyl) phenylphosphonate, dimethyl vinylphosphonate, dimethyl allylphosphonate, or bis(2-chloroethyl) 2-chloroethylphosphonate.

7. Other suitable starting components include, optionally, compounds containing at least two isocyanate-reactive hydrogen atoms and having a molecular weight in the range from 32 to 399. Such compounds include compounds containing hydroxyl groups, amino groups, thiol groups, or carboxyl groups, preferably compounds containing hydroxyl groups and/or amino groups, which serve as chain-extending or crosslinking agents. These compounds generally contain from 2 to about 8 (preferably from 2 to 4) isocyanate-reactive hydrogen atoms. Examples of such compounds are described in German Offenlegungsschrift 2,832,253 at pages 19–20.

8. Surface-active additives, such as emulsifiers and foam stabilizers, may optionally be used. Preferred emulsifiers are those based on alkoxylated fatty acids and higher alcohols.

Preferred foam stabilizers include polyether siloxanes, particularly water-insoluble types. These compounds generally are a copolymer of ethylene oxide and propylene oxide attached to a polydimethylsiloxane group. Water-soluble foam stabilizers are described, for example, in U.S. Pat. Nos. 2,834,748, 2,917,480, and 3,629,308, but are not suitable for the production of high-resilience (HR) foams.

It is also possible to use reaction retarders, for example, compounds having an acidic nature, such as hydrochloric acid or organic acid halides; known cell regulators, such as paraffins or fatty alcohols or dimethyl polysiloxanes; pigments or dyes; stabilizers against the effects of ageing and weather; plasticizers; fungistatic and bacteriostatic agents; and fillers, such as barium sulfate, kieselguhr, carbon black, or whiting.

Further examples of surface-active additives and foam stabilizers which may optionally be used in accordance with the invention, as well as cell regulators, reaction retarders, stabilizers, flameproofing agents, plasticizers, dyes and fillers, and fungistatic and bacteriostatic agents, and information on the use of these additives and the way in which they work, can be found in Kunststoff-Handbuch, Vol. VII, edited by Vieweg and Höchtlen, Carl-Hanser-Verlag, Munich 1966, for example, on pages 103 to 113.

In the process of the invention, the reaction components are reacted by the known one-shot process, the prepolymer process, or the semiprepolymer process. These processes can often be performed using machines, such as the type described in U.S. Pat. No. 2,764,565. Information on processing machines that may also be used in accordance with the invention can be found in Kunststoff-Handbuch, Vol. VII, edited by Vieweg and Höchtlen, Carl-Hanser-Verlag, Munich 1966, for example, on pages 121 to 205.

When preparing foams according to the invention, the foaming reaction may even be carried out in closed molds by introducing the reaction mixture into a mold. Suitable mold materials include metals, such as aluminum, or plastics, such as epoxy resins. The foamable reaction mixture foams in the mold, thereby forming the molded product. In-mold foaming may be carried out in such a way that the molding has a cellular structure at its surface or in such a way that the molding has a compact skin and a cellular core. In the process of the invention, it is possible to introduce foamable reaction mixture into the mold in such a quantity that the foam formed just fills the mold. It is also possible to introduce more foamable reaction mixture into the mold than is required to fill the interior of the mold with foam, a technique known as overcharging and described, for example, in U.S. Pat. Nos. 3,178,490 and 3,182,104.

In in-mold foaming, known "external release agents," such as silicone oils, are often used. However, it is also possible to use so-called "internal release agents," optionally in admixture with external release agents, of the type described, for example, in German Offenlegungsschriften 2,121,670 and 2,307,589.

The foams may, of course, also be produced by known slabstock foaming or laminator processes.

The ignition tests carried out under the stringent requirements of the Crib 5 Test according to BS 5852, Part 2, indicate that the compounds of the invention are eminently suitable as flameproofing agents. The mechanical properties of the resulting foams are also advantageous. For example, hardness is barely affected.

The process of the invention allows the manufacture of foams having a bulk density as low as 22 kg/m³ but which nevertheless meet the flameproofing requirements mentioned above.

The flame-resistant polyurethane foams are used for the manufacture of furniture and for the production of mattresses which satisfy the more stringent flameproofing standards and safety requirements, for example, according to BS 5852, Part 2, using the ignition sources mentioned therein.

These flame-resistant foams are used for the upholstering of seats in theaters, cinemas, homes, and restaurants and for the upholstering of couches.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

DESCRIPTION OF THE PREFERRED EMBODIMENTS

Example 1

100 parts a dispersion of a polyurea of hydrazine and tolylene diisocyanate in an active polyether-polyol of trimethylolpropane, propylene oxide, and ethylene oxide (OH number 32)
4.3 parts water
0.4 parts stabilizer AC 3367 from Bayer AG based on a polyether-modified silicone
0.1 parts activator Dabco 33LV (Houdry-Huls)(solution of triethylene diamine in DPG)
0.05 parts bis(2-dimethylaminoethyl) ether (activator A1) available from UCC)
1.5 parts diethanolamine
1.32 parts crosslinking agent PU 3229 from Bayer AG, amine cross-linking agent based on a higher alkanolamine
0.15 parts tin 2-ethylhexoate
5.0 parts dimethyl methylphosphonate
35.0 parts melamine of particle size 10 micrometers
6.0 parts fluorotrichloromethane
56.8 parts tolylene diisocyanate ("TDI")(80 wt. % 2,4-isomer and 20 wt. % 2,6-isomer)
Cream time of the reaction mixture: 8 sec
Bulk density of the foam: 22 kg/m³

The foam is tested with a 50-mm water column air resistance (initial pressure 2 bar) in the test in accordance with BS 5852, ignition Source 5.
Burning time: 220 sec
Loss in weight: 58 g
Consumer Protection no. 1324 (GB 1988) passed

Example 2

100 parts polyurea dispersion according to Example 1
4.3 parts water
0.4 parts stabilizer AC 3367 according to Example 1
0.1 parts activator Dabco 33LV according to Example 1
0.05 parts activator A1 according to Example 1
1.5 parts diethanolamine
1.32 parts crosslinking agent PU 3229 according to Example 1
0.15 parts tin 2-ethylhexoate
35.0 parts melamine of particle size 10 micrometers
8.0 dimethyl methylphosphonate
6.0 parts fluorotrichloromethane
56.8 parts tolylene diisocyanate according to Example 1

Cream time of the reaction mixture: 7 sec
Bulk density of the foam: 22.5 kg/m$^3$ The foam is tested with a 50-mm water column air resistance (see Example 1) in accordance with BS 5852, Ignition Source 5.
Burning time: 280 sec
Loss in weight: 52 g
Consumer Protection no. 1324 (GB 1988) passed

Example 3 (comparison experiment)

100 parts polyurea according to Example 1
4.3 parts water
0.4 parts stabilizer AC 3367 according to Example 1
0.1 parts activator Dabco 33LV according to Example 1
0.05 parts activator A1 according to Example 1
1.5 parts diethanolamine
1.32 parts crosslinking agent PU 3229 according to Example 1
0.15 parts tin 2-ethylhexoate
2.0 parts tetrakis(2-chloroethyl)ethylene diphosphate
6.0 parts fluorotrichloromethane
35.0 parts melamine of particle size 100–150 micrometers
56.8 parts tolylene diisocyanate according to Example 1
Bulk density: 22.5 kg/m$^3$ The foam is tested with a 50-mm water column air resistance (see Example 1) in accordance with BS 5852, Ignition Source 5.
Burning time: Extinguished after 300 sec
Loss in weight: about 180 g
Consumer Protection no. 1324 (GB 1988) failed

Example 4

100 parts polyurea dispersion according to Example 1
4.3 parts water
0.4 parts stabilizer AC 3367 according to Example 1
0.1 parts activator Dabco 33LV according to Example 1
0.05 parts activator A1 according to Example 1
1.5 parts diethanolamine
1.32 parts crosslinking agent PU 3229 according to Example 1
0.15 parts tin 2-ethylhexoate
35.0 parts melamine of particle size 10 micrometers
8.0 parts bis(2-chloroethyl) 2-chloroethylphosphonate
6.0 parts fluorotrichloromethane
56.8 parts tolylene diisocyanate according to Example 1
Cream time of the reaction mixture: 7 sec
Bulk density of the foam: 22.9 kg/m$^3$ The foam is tested with a 50-mm water column air resistance (see Example 1) in accordance with BS 5852, Ignition Source 5.
Burning time: 295 sec
Loss in weight: 50 g
Consumer Protection no. 1324 (GB 1988) passed

Example 5

100 parts polyurea dispersion according to Example 1
4.3 parts water
0.4 parts stabilizer AC 3367 according to Example 1
0.1 parts activator Dabco 33LV according to Example 1
0.05 parts activator A1 according to Example 1
1.5 parts diethanolamine
1.32 parts crosslinking agent PU 3229 according to Example 1
0.15 parts tin 2-ethylhexoate
35.0 parts melamine of particle size 10 micrometers
8.0 parts dimethyl vinylphosphonate
6.0 parts fluorotrichloromethane
56.8 parts tolylene diisocyanate according to Example 1
Cream time of the reaction mixture: 7 sec
Bulk density of the foam: 23.0 kg/m$^3$ The foam is tested with a 50-mm water column air resistance (see Example 1) in accordance with BS 5852, Ignition Source 5.
Burning time: 280 sec
Loss in weight: 49 g
Consumer Protection no. 1324 (GB 1988) passed

Example 6

100 parts polyurea dispersion according to Example 1
4.3 parts water
0.4 parts stabilizer AC 3367 according to Example 1
0.1 parts activator Dabco 33LV according to Example 1
0.15 parts activator A1 according to Example 1
1.5 parts diethanolamine
1.32 parts crosslinking agent PU 3229 according to Example 1
0.15 parts tin 2-ethylhexoate
35.0 parts melamine of particle size 10 micrometers
8.0 parts dimethyl allylphosphonate
6.0 parts fluorotrichloromethane
56.8 parts tolylene diisocyanate according to Example 1
Cream time of the reaction mixture: 7 sec
Bulk density of the foam: 22.9 kg/m$^3$ The foam is tested with a 50-mm water column air resistance (see Example 1) in accordance with BS 5852, Ignition Source 5.
Burning time: 281 sec
Loss in weight: 51 g
Consumer Protection no. 1324 (GB 1988) passed Examples 1, 2, and 4 through 6 show that the foams produced in open-cell form comply with Consumer Protection no. 1324 (GB 1988).

The results of Examples 1 and 2 are also surprising in that the use of the combination of melamine with phosphonates makes it possible, with relatively small amounts of additives, to achieve stringent flameproofing requirements.

Example 7 (Comparison Example)

100 parts polyurea dispersion according to Example 1
4.3 parts water
0.4 parts stabilizer AC 3367 according to Example 1
0.1 parts activator Dabco 33LV according to Example 1
0.05 parts activator A1 according to Example 1
1.5 parts diethanolamine
1.32 parts crosslinking agent PU 3229 according to Example 1
0.15 parts tin 2-ethylhexoate
2.0 parts dimethyl methylphosphonate
6.0 parts fluorotrichloromethane
35.0 parts melamine of particle size 100–150 micrometers
56.8 parts tolylene diisocyanate according to Example 1
Bulk density: 22.9 kg/m$^3$ The foam is tested with a 50-mm water column air resistance (see Example 1) in accordance with BS 5852, Ignition Source 5.
Burning time: Extinguished after 300 sec
Loss in weight: about 120 g
Consumer Protection no. 1324 (GB 1988) failed

What is claimed is:

1. A process for the preparation of polyurethane foams comprising reacting
   (1) a polyisocyanate with
   (2) a polymer-modified polyol having a molecular weight of from 400 to 10,000 and containing at least two isocyanate-reactive hydrogen atoms,
in the presence of
   (3) water and/or an organic blowing agent,
   (4) a catalyst,
   (5) melamine as a flameproofing agent, and
   (6) a phosphonic acid ester flameproofing agent selected from the group consisting of compounds having the formulas

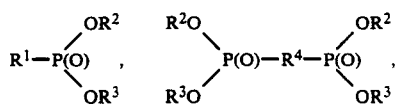

and

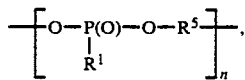

wherein
   $R^1$ is $C_1$–$C_6$ alkyl, $C_2$–$C_6$ unsaturated alkyl, $C_5$–$C_{12}$ cycloalkyl, $C_7$–$C_{15}$ aralkyl, or $C_6$–$C_{12}$ aryl,
   $R^2$ and $R^3$ are independently $C_1$–$C_6$ alkyl, $C_2$–$C_6$ unsaturated alkyl, $C_5$–$C_{12}$ cycloalkyl, $C_7$–$C_{15}$ aralkyl, or $C_6$–$C_{12}$ aryl, or $R^2$ and $R^3$ together are $C_2$–$C_4$ alkylene,
   $R^4$ is $C_1$–$C_6$ alkylene, $C_5$–$C_{12}$ cycloalkylene, $C_7$–$C_{15}$ aralkylene, or $C_6$–$C_{12}$ arylene,
   $R^5$ is $C_2$–$C_6$ alkylene, $C_5$–$C_{12}$ cycloalkylene, $C_7$–$C_{15}$ aralkylene, or $C_6$–$C_{12}$ arylene, and n is an integer of from 1 to about 100.

2. A process according to claim 1 additionally comprising
   (7) a compound containing at least two isocyanate-reactive hydrogen atoms and having a molecular weight of from 32 to 399.

3. A process according to claim 2 additionally comprising
   (8) known surface-active additives and auxiliaries.

4. A process according to claim 1 wherein the polymer-modified polyol is a polyurea dispersion in a polyether.

5. A process according to claim 1 wherein the polymer-modified polyol is an alkanolamine adduct of a diisocyanate in a polyether.

6. A process according to claim 1 wherein the polymer-modified polyol is a grafted polyether obtained by polymerization of acrylonitrile and/or styrene in a polyether.

7. A process according to claim 1 wherein the melaine has a particle size of from 5 to 50 micrometers.

8. A process according to claim 1 wherein the phosphonic acid ester flameproofing agent is selected from the group consisting of dimethyl methylphosphonate, dimethyl ethylphosphonate, dimethyl phenylphosphonate, dimethyl vinylphosphonate, dimethyl allylphosphonate, and bis(2-chloroethyl) 2-chloroethylphosphonate.

9. A process according to claim 8 wherein the melamine has a particle size of from 5 to 90 micrometers.

10. A process according to claim 9 additionally comprising
    (7) a compound containing at least two isocyanate-reactive hydrogen atoms and having a molecular weight of from 32 to 399.

11. A process according to claim 9 additionally comprising
    (8) known surface-active additives and auxiliaries.

* * * * *